United States Patent
Jurianz et al.

(10) Patent No.: US 10,128,009 B2
(45) Date of Patent: *Nov. 13, 2018

(54) SYSTEM FOR HANDLING FUEL ELEMENTS

(71) Applicant: SIEMPELKAMP INGENIEUR AND SERVICE GmbH, Krefeld (DE)

(72) Inventors: Christian Jurianz, Krefeld (DE); Stefan Bauer, Einhausen (DE); Stefan Oliver Steck, Ober-Ramstadt (DE)

(73) Assignee: SIEMPELKAMP INGENIEUR AND SERVICE GMBH, Krefeld (DE)

( * ) Notice: Subject to any disclaimer, the term of this patent is extended or adjusted under 35 U.S.C. 154(b) by 1322 days.

This patent is subject to a terminal disclaimer.

(21) Appl. No.: 14/270,797

(22) Filed: May 6, 2014

(65) Prior Publication Data
US 2014/0334587 A1    Nov. 13, 2014

(30) Foreign Application Priority Data

May 8, 2013   (DE) .................. 10 2013 104 765

(51) Int. Cl.
*G21C 19/10*   (2006.01)
*G21C 19/18*   (2006.01)

(52) U.S. Cl.
CPC ............. *G21C 19/10* (2013.01); *G21C 19/18* (2013.01)

(58) Field of Classification Search
CPC ........ G21C 19/20; G21C 19/18; G21C 19/32; G21C 19/10

USPC .......................... 414/152, 146, 167, 168, 192
See application file for complete search history.

(56) References Cited

U.S. PATENT DOCUMENTS

| | | | | |
|---|---|---|---|---|
| 4,096,031 A | * | 6/1978 | Wade | G21C 19/08 376/270 |
| 4,202,729 A | * | 5/1980 | Allain | G21C 19/20 294/906 |
| 4,440,718 A | * | 4/1984 | Plagnard | G21C 19/18 376/269 |
| 6,354,568 B1 | * | 3/2002 | Carruthers | F16K 3/0209 174/47 |

* cited by examiner

*Primary Examiner* — Mark C Hageman
(74) *Attorney, Agent, or Firm* — Andrew Wilford (57) ABSTRACT

Fuel elements are moved between an upper pool and a lower pool of a nuclear plant by a conveyor tube having an upper end at the upper pool and a lower end at the lower pool and extending at an acute angle to the vertical between the ends. A plurality of transport baskets can move through the conveyor tube, each holding at least one of the fuel. An upper transfer device at the upper end in the upper pool loads the fuel elements into or unloads them from the transport baskets. A lower transfer device in the lower pool loads fuel elements into or unloads them from the transport baskets. Each transfer device can hold two of the transport baskets that are displaceable for positioning above or below the conveyor tube and movable during displacement through the tube between a vertical transfer position and an angled transport position.

14 Claims, 13 Drawing Sheets

SYSTEM FOR HANDLING FUEL ELEMENTS

FIELD OF THE INVENTION

The invention relates to a system for transferring fuel elements between an upper pool and a lower pool of a nuclear plant.

BACKGROUND OF THE INVENTION

A typical nuclear plant has its upper pool in a reactor building and the lower pool of a fuel-element storage unit. The reactor can be a boiling-water reactor, for example, or also a pressurized-water reactor. Fuel elements are transferred between the pools by a system or apparatus comprising a conveyor tube connecting the upper and the lower pool and extending at an acute angle to the vertical, one or more transport baskets into each of which at least one of the fuel elements can be placed for transfer through the conveyor tube, an upper transfer device in the upper pool for loading fuel elements into and unloading them from the transport baskets, and/or a lower transfer device in the lower pool for loading fuel elements into and unloading them from the transport baskets.

In a nuclear plant, replacement and transfer of fuel elements has particular importance in practice. In this connection, fuel elements generally consist of a bundle of individual fuel rods, and the fuel element itself is equipped with a handle or the like so that it can be transported using suitable machines, for example in order to set it into the reactor vessel or remove it from the reactor vessel. Thus, spent fuel elements, in particular, must be removed from the reactor vessel and transported to a fuel-element storage unit, for example. Conversely, fresh fuel elements must be loaded into the reactor vessel. In practice, it is usual to fill the upper pool in the reactor building during the fuel element exchange, so that the fuel elements are transported in liquid (water). They are taken out of the open reactor vessel using a handler that can be moved above the reactor vessel and moved into the upper pool and temporarily stored, if necessary, in a buffer pool/cooling pond. From the upper pool, the fuel elements must be transported to a fuel-element storage unit, for example, using a transfer system, the storage unit also having a (lower) pool, the upper pool (for example in the reactor building) and the lower pool (for example in the fuel-element storage unit) being filled to a different liquid level, independent of one another. Transport using the transfer system takes place between these two pools through a conveyor tube mounted at an angle to the vertical. Such transfer systems are basically known from practice. In this connection, an effort is made to keep the time expenditure for a fuel element exchange as short as possible in order to reduce interruptions in the power operation of the reactor as much as possible. The reduction in the time required for the fuel element exchange has particular importance from an economic point of view.

In a transfer system for fuel elements of a nuclear reactor facility known from U.S. Pat. No. 3,952,885 the fuel elements are transported through a conveyor tube oriented at an angle to the vertical. The conveyor tube leads through the safety sheath that encloses the pressurized reactor vessel of a pressurized-water reactor in a gas-tight manner. The inner pool and the outer pool are filled to the same liquid level during the fuel element exchange, so that no blocking measures in the region of the conveyor tube are necessary during transfer of the fuel elements. Transport takes place using a cable hoist and using a carriage that has two chambers, of which one accommodates a fresh fuel element for the trip there, and the other a spent fuel element for the return trip. In this connection, the carriage can pivot from a vertical transfer position into a horizontal or angled transport position. The known transfer system exclusively serves for transfer of fuel elements between two pools filled to the same liquid level.

The same holds true for the transfer system known from U.S. Pat. No. 4,096,031, with which fuel elements are transported directly between the reactor vessel and a storage container mounted directly next to it, where the reactor vessel and the storage container are connected with one another by a transport tube that extends at an acute angle to the vertical. Transfer devices are provided at the end of this conveyor tube that can pivot the fuel elements from an angled transport position into a vertical transfer position. Transfer through the conveyor tube takes place using a cable hoist that directly grips the fuel element with a grab.

U.S. Pat. No. 3,058,900 describes a charging apparatus for nuclear reactors in which fuel elements are transported directly between the reactor vessel and a channel that runs horizontally below the reactor vessel, the reactor vessel and the channel being connected with one another by a tube that is oriented at an angle to the vertical. For transport, a fuel element is inserted into a cartridge that can be transported through the tube, the cartridge bing provided at the top with a handle or the like so that it can be gripped by a tool. The tube can be closed off completely using a blocking element. This blocking element is opened when a fuel element exchange takes place by means of the charging apparatus.

A loading and unloading apparatus for fuel elements is known from U.S. Pat. No. 4,202,729 in which the apparatus sits on the top of the reactor vessel and has two ramps extending at an angle to the vertical in opposite directions and between which the fuel elements can pivot using a pivoting apparatus. An apparatus having a similar construction is known from U.S. Pat. No. 4,440,718.

OBJECTS OF THE INVENTION

It is therefore an object of the present invention to provide an improved system for handling fuel elements.

Another object is the provision of such an improved system for handling fuel elements that overcomes the above-given disadvantages, in particular that provides for fast and efficient transfer of fuel elements between an upper pool and a lower pool of a nuclear plant.

Particularly preferably, this transfer system is supposed to be suitable for transfer between an upper pool and a lower pool that have different liquid levels.

SUMMARY OF THE INVENTION

A system for transferring fuel elements between an upper pool and a lower pool of a nuclear plant has according to the invention a conveyor tube having an upper end at the upper pool and a lower end at the lower pool and extending at an acute angle to the vertical between the ends. A plurality of transport baskets can move through the conveyor tube and each can carry at least one of the fuel elements for transport between the pools. An upper transfer device at the upper end in the upper pool can load the fuel elements into or unload them from the transport baskets, and a lower transfer device in the lower pool can load fuel elements into or unload them from the transport baskets. Each of the devices is adapted to hold two of the transport baskets. The baskets are displaceable for positioning above or below the conveyor tube and are movable during displacement through the tube between a vertical transfer position and an angled transport position.

Preferably, the upper transfer device and/or the lower transfer device has two pivot frames into each of which a transport basket can be set and in which the respective transport baskets can pivot between a vertical transfer position and an angled transport position. In this connection, the pivot frames (with the transport baskets provided in them) can be mounted so as to pivot about a common (horizontal) axis. Particularly preferably, the pivot frames can be displaced together horizontally, and can be pivoted automatically during displacement by the transport baskets set into them. This can be done, for example, in that the pivot frames of the transport baskets set into them are guided in/on control rails during displacement in such a manner that the transport baskets pivot automatically, preferably in that lower control pins are guided in the control rails. Such control rails can be curved, for example.

The invention first of all proceeds from the recognition that fast and efficient transfer of fuel elements through a conveyor tube can be done if the fuel elements themselves are transported through the conveyor tube not directly, but rather in transport baskets, wherein particularly preferably, a plurality of fuel elements, for example four fuel elements, can be set into each transport basket. Loading and unloading of the transport baskets with fuel elements takes place in a vertical transfer position, and transport itself takes place in an angled transport position corresponding to the angle of the conveyor tube to the vertical. The transfer device according to the invention allows fast loading and unloading of the transport baskets, and, at the same time, simple and fast loading of the transport baskets into the conveyor tube. This is because two transport baskets can be set in at the same time, in the region of the transfer device, where one transport basket is provided above/below and consequently aligned with the conveyor tube in the angled transport position, and the other transport basket can be laterally offset next to the conveyor tube, in a vertical transfer position. This brings about the possibility of loading/unloading the transport basket in the vertical transfer position while a further transport basket is in the angled transport position or even in the conveyor tube. Consequently, the transport baskets can be positioned either aligned with the conveyor tube, or positioned next to the conveyor tube for transfer by displacement of the transport baskets in the transfer device. Particularly preferably, during this displacement, pivoting of the transport baskets into the respective position, i.e. either into the transfer position or into the transport position, takes place on its own and consequently automatically. In this way, it can be sufficient to equip the transfer device merely with a displacement drive that shifts the transport baskets linearly, where then during displacement pivoting takes place automatically without an additional drive. Taking into consideration the fact that the transfer device is in the pool and consequently underwater, it is very advantageous if the number of required drives can be reduced. Nevertheless, simple, fast, and automated loading and unloading of the transport baskets, and, at the same time, rapid transfer through the conveyor tube, take place within the scope of the invention. Particularly preferably, automatic pivoting during displacement occurs in connection with the pivot frames and/or control rails described.

According to another suggestion of the invention, the pivot frames can be mounted so as to pivot in a common displacement frame and can be displaced with it, the pivot frames with the transport baskets set into them being positionable by displacement of the pivot frame relative to the conveyor tube, and being automatically positioned in this connection. The displacement frame itself can be guided so as to be displaceable in a (stationary) support frame, wherein one or more of the control rails described can be connected with the support frame.

It lies within the scope of the invention that merely the upper transfer device or the lower transfer device is designed for two transport baskets in the embodiment described. The remaining other transfer device can be designed for merely a single transport basket. In this case, the system is preferably operated with two transport baskets.

Particularly preferably, however, both the upper transfer device and the lower transfer device are configured in the manner according to the invention, so that two transport baskets can be both in the upper transfer device and in the lower transfer device. In this case, the work is performed with (precisely) three transport baskets, where a first transport basket is in the upper transfer device, a second transport basket is in the lower transfer device, and a third transport basket is either in the conveyor tube or in one of the transfer devices. In this manner, particularly rapid transfer of the fuel elements and consequently an accelerated fuel element exchange take place, so that down time of the reactor for a fuel element exchange can be clearly reduced. This can be achieved with simple and reliable design and handling of the apparatuses described.

Preferably, the transfer system is equipped with a cable hoist that has a traction cable guided through the conveyor tube for raising and lowering the transport baskets through the conveyor tube. Such a cable hoist is characterized by simple and reliable handling. It can be excellently combined with the transfer devices according to the invention. This particularly holds true when a lift carriage is guided through the conveyor tube, on which carriage the traction cable is connected and onto which a transport basket can be set for transport. The lift carriage is consequently provided underneath the transport basket during transport, so that the cable hoist, according to the invention, does not engage directly on the transport baskets, at the top, but rather (indirectly) through the lift carriage. Such an embodiment is practical, when, among other things, the conveyor tube, at its upper end, can be closed off with a blocking device, and if a cable inlet port is laterally integrated into the conveyor tube below this upper blocking element, through which inlet the traction cable passes from the tube interior to the cable winch. In this embodiment, the cable of the cable hoist is consequently introduced into the conveyor tube from the cable winch not on the end, but rather through an (upper) lateral cable inlet port, so that the cable feed into the conveyor tube takes place below an upper (fully closing) blocking element, for example a slide. This has the advantage that the upper blocking element can basically be closed again after introduction of the fuel elements into the conveyor tube, because transport is possible, using the cable hoist, even when the upper blocking element is closed. The upper blocking element consequently only has to be opened for a short period of time if the fuel elements must be lowered or raised past the upper blocking element. In connection with the lift carriage described, the possibility exists that the lift carriage does not have to move completely out of the conveyor tube at the top, but rather merely into the region of the upper end of the conveyor tube, since the lateral cable inlet port that engages on the lift carriage is provided there. Preferably, not only an upper blocking element is provided, but also a lower blocking element at the lower tube end, and these blocking elements, as fully closing blocking elements, for example as slides, can close the tube off in liquid-tight manner. Furthermore, it can be practical to integrate into the conveyor tube one or more (partially closing) blocking elements that each have a cable passage through which the traction cable can pass in the closed position. Thus, one or more, for example two partially closing intermediate blocking elements can be provided between the upper (fully closing) blocking element and the lower (fully closing) blocking element, and can be equipped, for example as ball valves, with a cable passage, for example a hole in the valve ball. A partially closing blocking element is a blocking element that, while it can be brought into a completely open position on the one hand and into a closed position on the other hand, still has a cable passage in the closed position (closing position), and consequently a correspondingly dimensioned opening (for example a groove), so that the traction cable of the cable hoist can pass through the blocking element for perfect transfer. The slight leaks that might occur due to the cable passage, in this connection, can be accepted and evened out again by appropriate pumping. The deciding factor is the fact that such leaks can be reduced to a minimum, using the partially closing blocking elements.

In this connection, pneumatic actuators, for example, can be used for the blocking elements. Alternatively, however, electrical or hydraulic drives can also be used.

Furthermore it is practical that the transport baskets and/or the lift carriage is/are guided on guide rails, by guide elements, for example guide rollers, which rails are mounted on the inside wall of the conveyor tube. Furthermore it can be practical to provide guide rails for at least the transport baskets, and, if applicable, also for the lift carriage, also in the region of the pivot frames.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
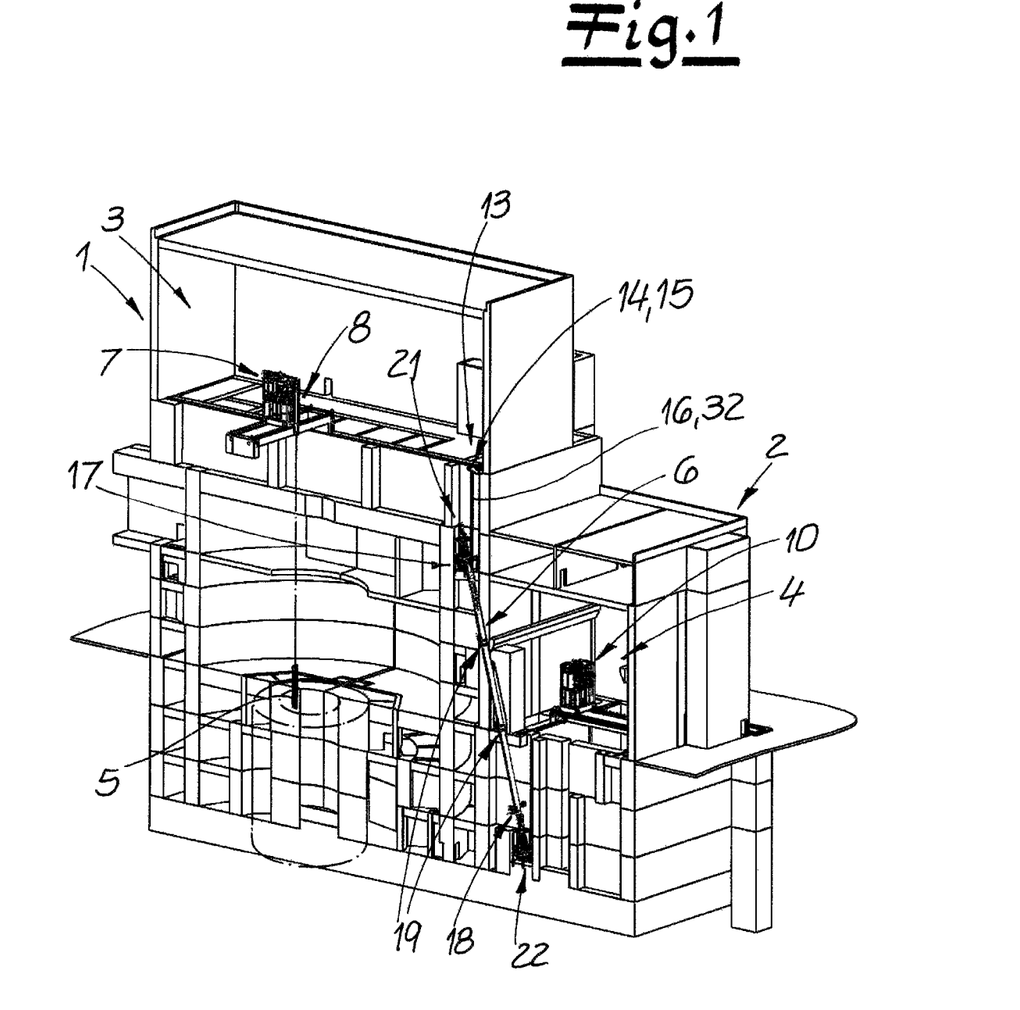
FIG. 1 is a perspective vertical section through a nuclear plant with reactor building and fuel-element storage unit.

FIG. 1 shows in a simple view a nuclear reactor facility having a reactor building 1 in which an unillustrated nuclear reactor, for example a boiling-water reactor, is provided. A fuel-element storage unit 2 is provided next to the reactor building 1. An upper pool 3 filled to an upper level with liquid lies in the reactor building. A lower pool 4 filled to a lower liquid level is provided near the fuel-element storage unit 2. During a fuel element exchange, (spent) fuel elements 5, for example, are moved by a transfer system 6 out of the reactor, through the upper pool 3, and into the region of the lower pool 4 and/or conversely new fuel elements are transported upward. To remove the fuel elements 5 from the reactor vessel, a handler 7 is provided in the reactor building 1 that can remove a fuel element 5 from the reactor vessel, for example, and transport it to the transfer system 6 in the region of the upper pool 3. To this end, the handler 7 can be equipped with for example a telescoping grab 8 that can grip a handle 9 of the fuel element 5. Similarly, a handler 10 provided in the fuel-element storage unit 2 can move the fuel elements 5 away from or to the transfer system 6. The present invention concerns itself with the transfer system 6 that can transport the fuel elements 5 between the upper pool 3 of the reactor building 1 and the lower pool 4 of the fuel-element storage unit 2, the liquid level of the upper pool lying above the liquid level of the lower pool. The transfer system 6 has a conveyor tube 11 extending at an acute angle to the vertical between the upper and lower pools. Furthermore, the transfer system has a plurality of transport baskets 12, i.e. the fuel elements themselves are transported through the conveyor tube 11 not directly, but rather in the transport baskets 12, and in this embodiment four fuel elements can be set into a transport basket. Furthermore, the transfer system 6 has a cable hoist 13 in turn that has a cable winch 14, a drive 15, and a traction cable 16 and that works in the conveyor tube 11 for raising and lowering the transport baskets 12. The conveyor tube 11 is equipped with a plurality of blocking elements 17, 18, and 19 that can close off the tube passage to prevent or minimize flow of liquid from the upper pool 3 into the lower pool 4. The conveyor tube 11 is provided at its upper end with an upper fully closing blocking element 17, and, at its lower end, with a lower fully closing blocking element 18, these blocking elements 17, 18 being configured as slides. Sufficient space is available at these locations for use of slides. A plurality of further blocking elements, namely a plurality of partially closing intermediate elements 19, are provided between the upper blocking element 17 and the lower blocking element 18; in this embodiment, these are configured as ball valves. Ball valves are used at these locations because the conveyor tube 12 runs inside a concrete sleeve and relatively little space is available.

The difference between the fully closing blocking elements 17 and 18 and the partially closing blocking elements 19 is that the partially closing blocking elements are provided with a cable passage 30 through which the traction cable 16 can pass in the closed position of the blocking element 19. In contrast, the fully closing blocking elements 17 and 18 are configured without such cable passages. The blocking elements 17, 18, and 19 must be opened completely to be able to move a transport basket 12 through the respective locations. The partially closing blocking elements 19 can, however, be closed after the transport basket 12 has passed because the traction cable 16 of the cable hoist passes through the cable passage 30 even in the closed valve position. The transfer system 6 furthermore has a lift carriage 20, i.e. the traction cable 16 of the cable hoist 13 does not engage the transport baskets 12, but rather is connected with the separate lift carriage 20 that engages underneath the transport basket 12, i.e. the transport basket 12 is set onto the lift carriage 20 during transfer. The advantages of this configuration will be discussed below.

Figure 2:
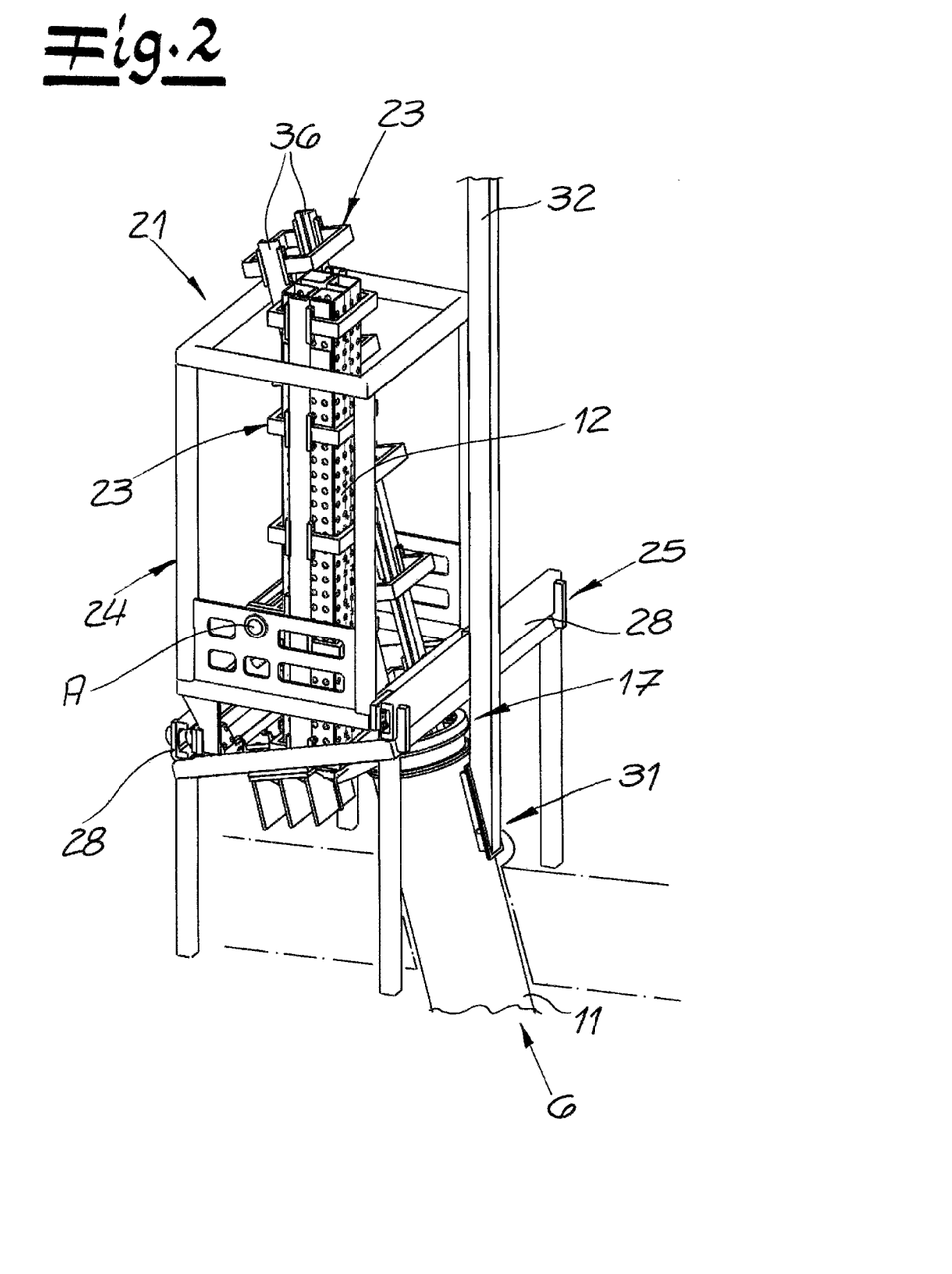
FIG. 2 is a large-scale detail view of the structure shown in FIG. 1 in the region of the upper transfer device.

Furthermore, the transfer system 6 according to FIG. 2 has an upper transfer device 21 in the upper pool 3 for loading the fuel elements 5 into and/or unloading them from the baskets 12. In the lower pool 4, the transfer system 6 has a lower transfer device 22 (FIG. 3) for loading the fuel element 5 into and/or unloading them from the baskets 12.

Figure 3:
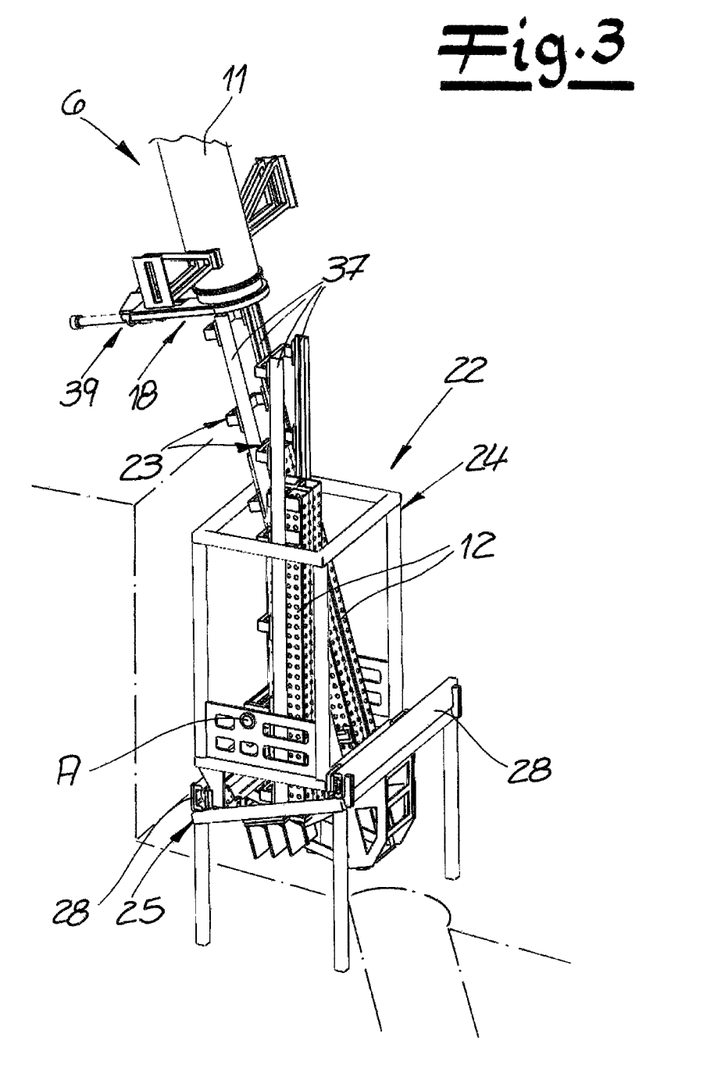
FIG. 3 is a large-scale detail view of the structure shown in FIG. 1 in the region of the lower transfer device.
Figure 4:
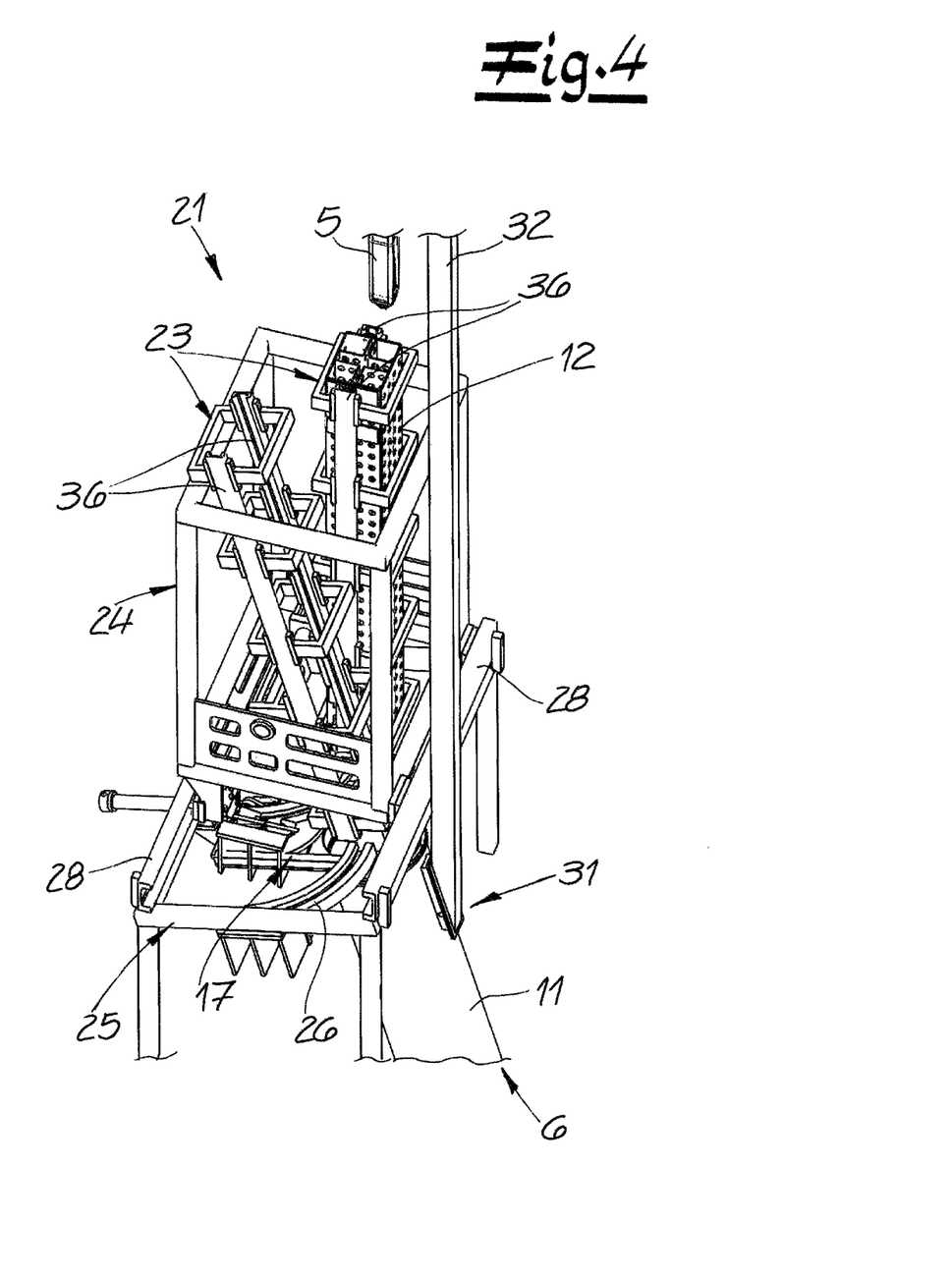
FIG. 4 is a different view of the upper transfer device.
Figure 5:
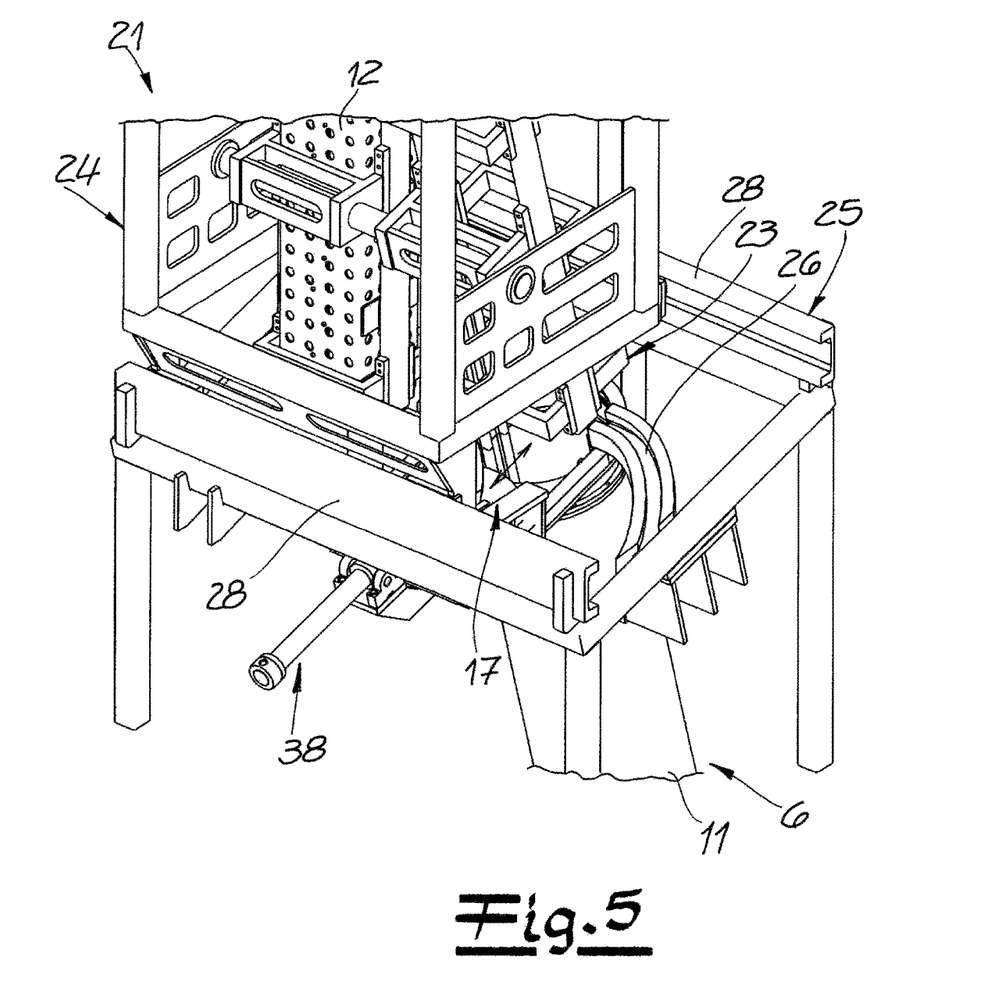
FIG. 5 is a large-scale detail view of the structure shown in FIG. 4, FIGS. 6a and 6b show the upper transfer device in two different functional positions.
Figure 6A:
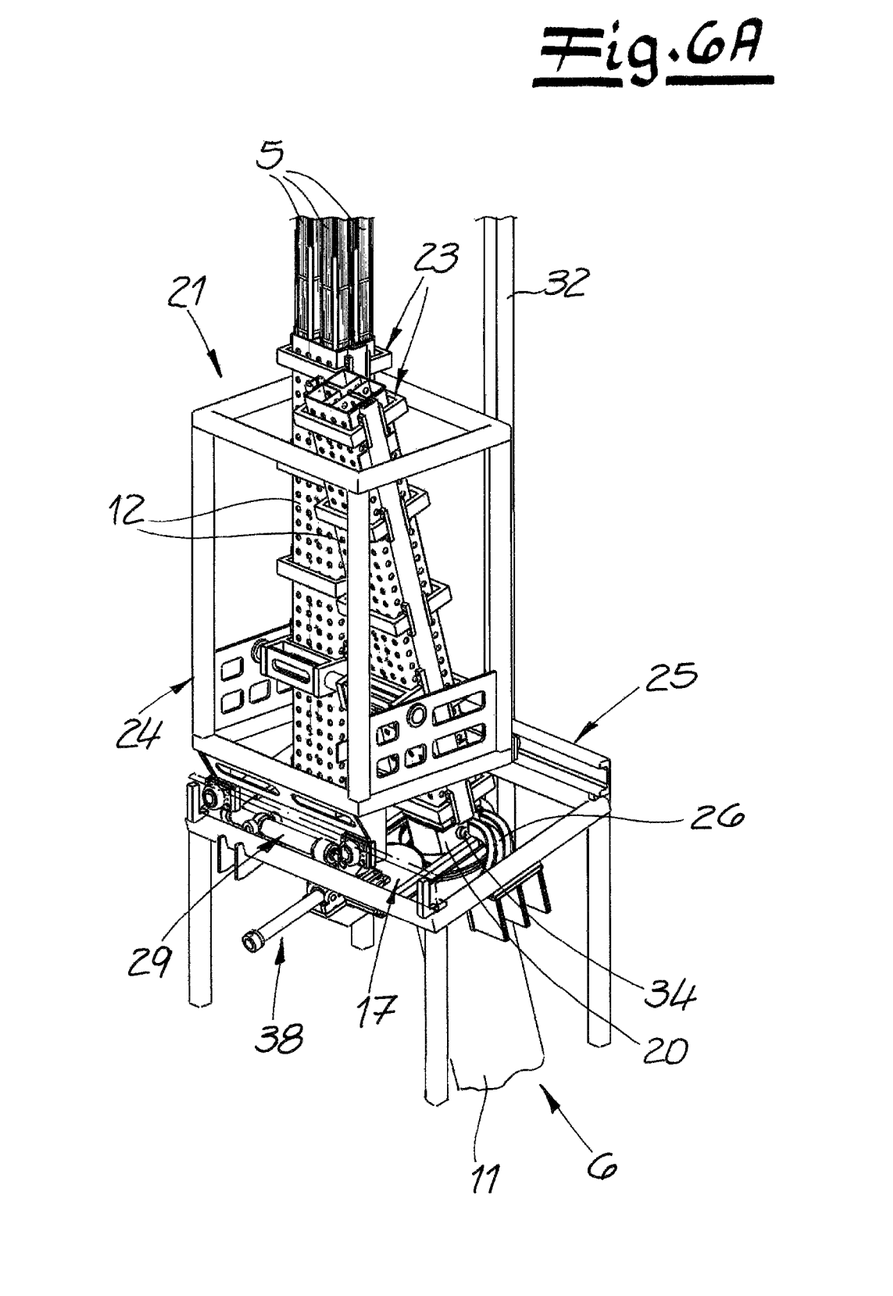
Figure 6B:
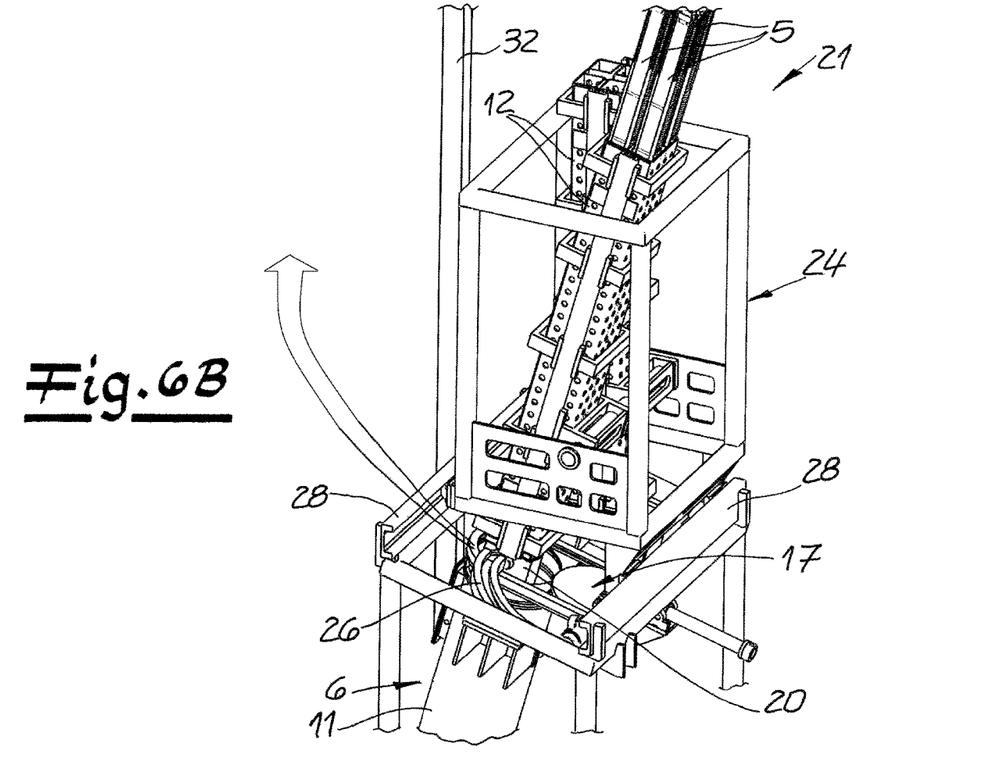

For the transfer of the fuel elements 5 from the upper pool 3 into the lower pool 4, first a transport basket 12 is loaded with fuel elements 5 by the upper transfer device 21. Then, the transport basket 12 is transported by the upper transfer device 21 through the conveyor tube 11 into the region of the lower transfer device 22, specifically using the cable hoist 13. In the lower transfer device 22, the fuel elements 5 can then (for example using the handler 10) be removed from the transport basket 12. Subsequently, the transport basket 12 (for example empty without fuel elements) can be transported back up through the conveyor tube 11, again using the cable hoist 13.

In order to guarantee a rapid and thereby efficient transfer, the upper transfer device 21 and the lower transfer device 22 can each be loaded with two of the baskets 12 that can be displaced horizontally for positioning above or below the conveyor tube 11, and, during displacement can pivot, preferably automatically, between a vertical transfer position and an angled transport position. The transport baskets 12 are consequently loaded with the fuel elements 5 in the vertical transfer position and accordingly the fuel elements 5 are also removed from the transport baskets 12 in this vertical transfer position. For transport through the conveyor tube 11, the transport baskets 12 are then pivoted into the angled transport position. In this embodiment, this pivoting of the transport baskets 12 takes place automatically during displacement of the transport baskets 12. This will be explained first using the upper transfer device 21 as an example. The upper transfer device 21 is equipped with two pivot frames 23 into each of which a transport basket can be set and in which the transport baskets 12 can pivot between a vertical transfer position and an angled transport position. In this connection, the two pivot frames 23, with the transport baskets 12 provided in them, are mounted so as to pivot about a common (horizontal) axis A in opposite directions. The two pivot frames 23 can be jointly displaced horizontally, and can be automatically pivoted by the transport baskets 12 set into them, during displacement, specifically in opposite directions. To this end, the two pivot frames 23 are mounted so as to pivot in a common displacement frame 24 and can be displaced with it, the pivot frames with the transport baskets 12 set into them being positionable relative to the conveyor tube by displacement of the displacement frame 24 in the support frame 25, and, in this connection, being automatically pivotable. This is possible by means of control rails 26 that are curved in this embodiment, the pivot frames 23 or the transport baskets 12 set into them being guided in the control rails 26 during displacement such that the transport baskets 12 pivot automatically because the transport baskets 12 in this embodiment have control pins 27 on the lower side that engage into the control rails 26. In this connection, the support frame 25 has two guide rails 28 in which the displacement frame 24 is guided horizontally and linearly, specifically by a drive 29.

The lower transfer device 22 is configured similarly, and also has a support frame 25, a displacement frame 24, and two pivot frames 23. Preferably, three transport baskets are provided.

The method of functioning of the transfer system 6 according to the invention will now be explained using FIGS. 4 to 10a and 10b. First, the fuel elements 5 are removed from the reactor vessel using the handler 7 and transported into the region of the upper transfer device 21. There, a transport basket 12 is in a pivot frame 23, in the vertical transfer position, so that four fuel elements can be set into the transport basket 12 (see FIG. 4). This transport basket 12 is situated, in the vertical transfer position laterally offset next to the conveyor tube 11. An empty transport basket 12 is above the conveyor tube 11, for example, in the angled transport position where this empty transport basket 12 was transported upward during loading of the other transport basket from the region of the lower transfer device 22, for example.

In order to now position the filled transport basket 12 above the conveyor tube 11, the displacement frame 24 with the pivot frames 23 provided in it is displaced. This is evident from a comparison of FIGS. 6a and 6b that show the upper transfer device 21 in different functional positions and in different views. The transport baskets 12 engage into the control rails 26 with their lower control pins 27, so that during displacement of the displacement frame 24, and thereby also of the pivot frames 23, these pivot frames 23 with the transport baskets 12 set into them pivot in opposite directions, so that the filled transport basket 12 is not only positioned above the conveyor tube 11, but also, at the same time, pivoted from the vertical transfer position into the angled transport position.

The lift carriage 20, with which an empty transport basket 12 was previously transported from below to above, is consequently still in the region of the upper end of the conveyor tube 11, so that the filled transport basket 12 is set onto the lift carriage 20 during displacement of the displacement frame 24. The upper blocking element 17 is open, in this connection (see FIG. 5).

Figure 7A:
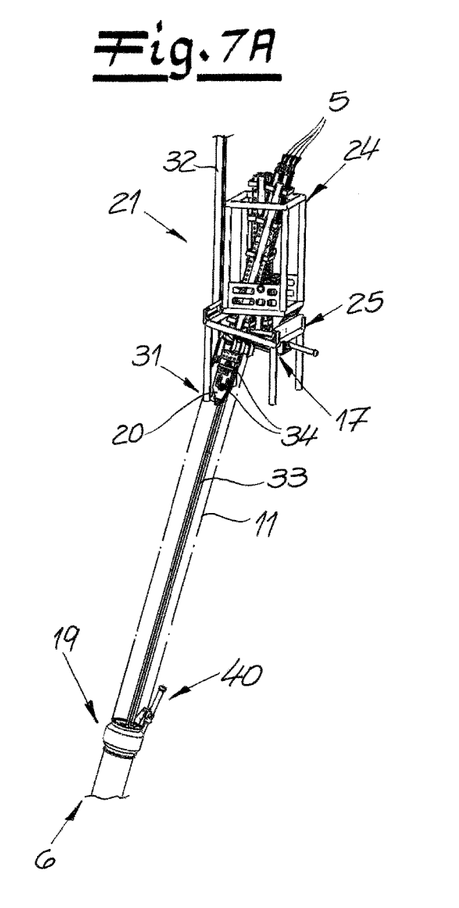
FIGS. 7a and 7b are further large-scale detail views of the structure shown in FIG. 1 in a different view.
Figure 7B:
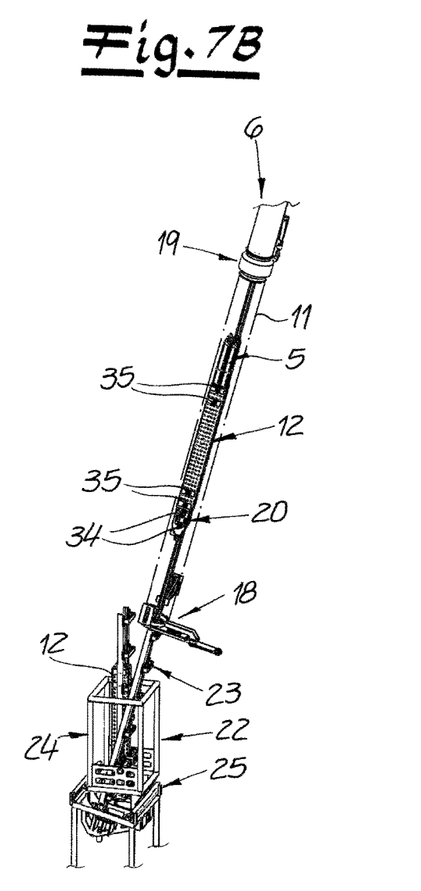
Figure 8A:
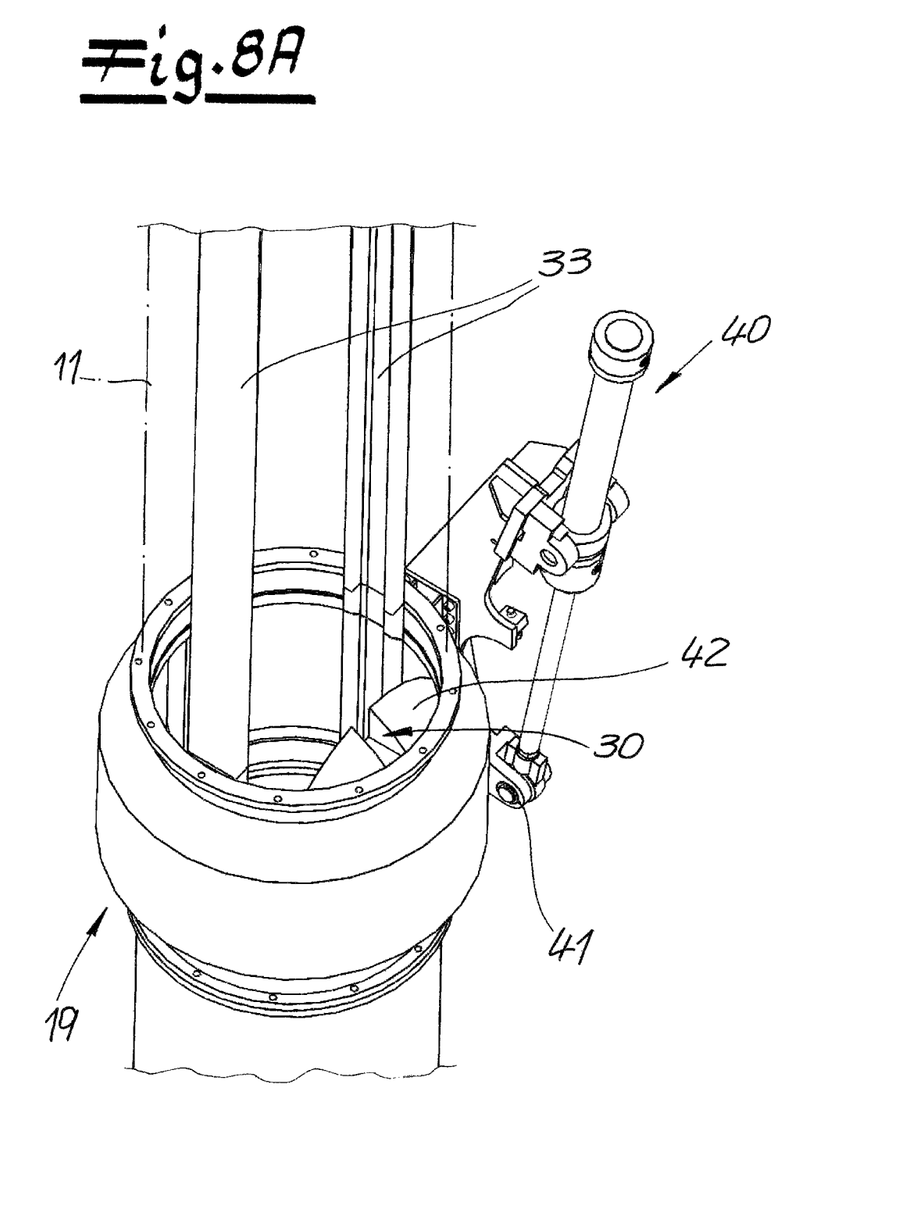
FIGS. 8a and 8b are large-scale detail views of the structure shown in FIG. 7a in different functional positions.
Figure 8B:
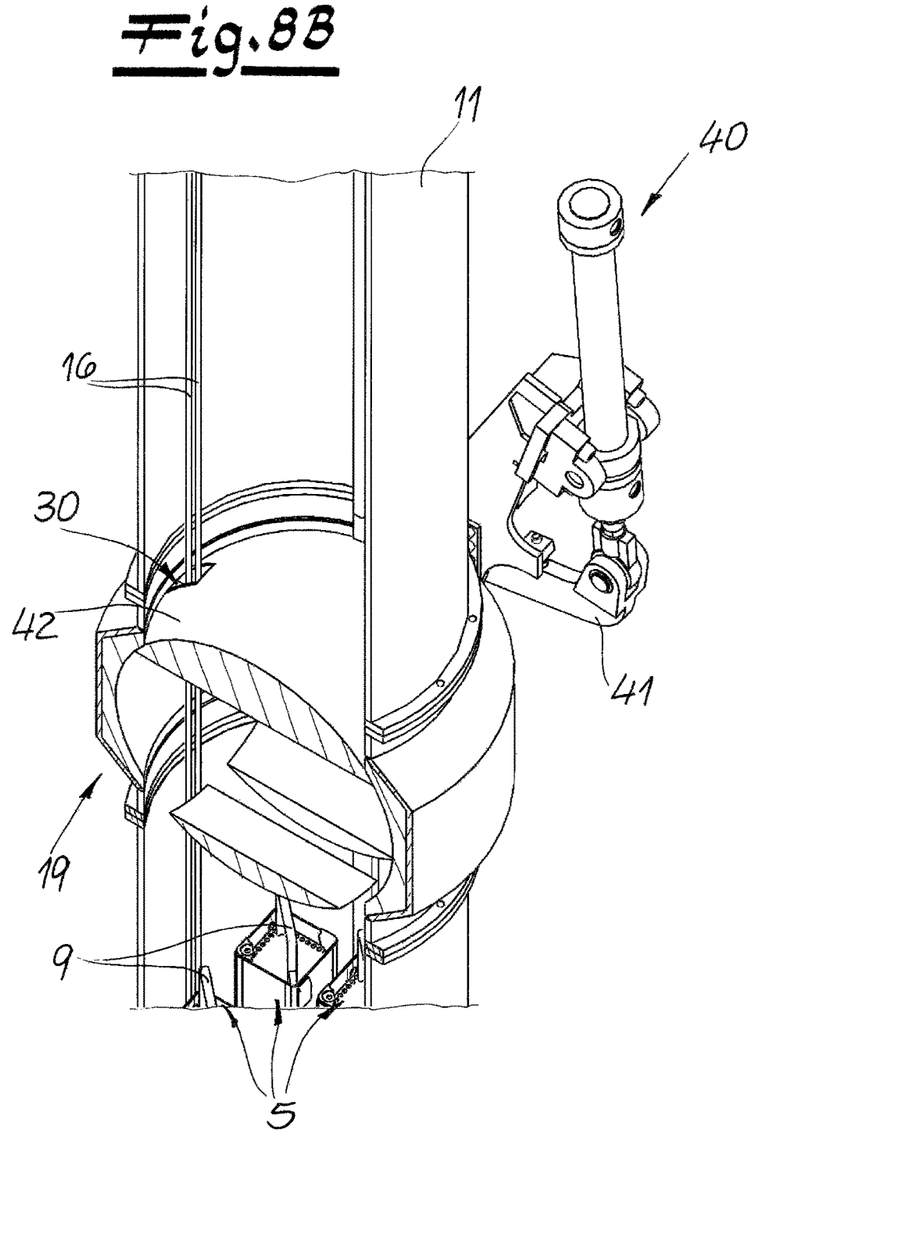
Figure 9:
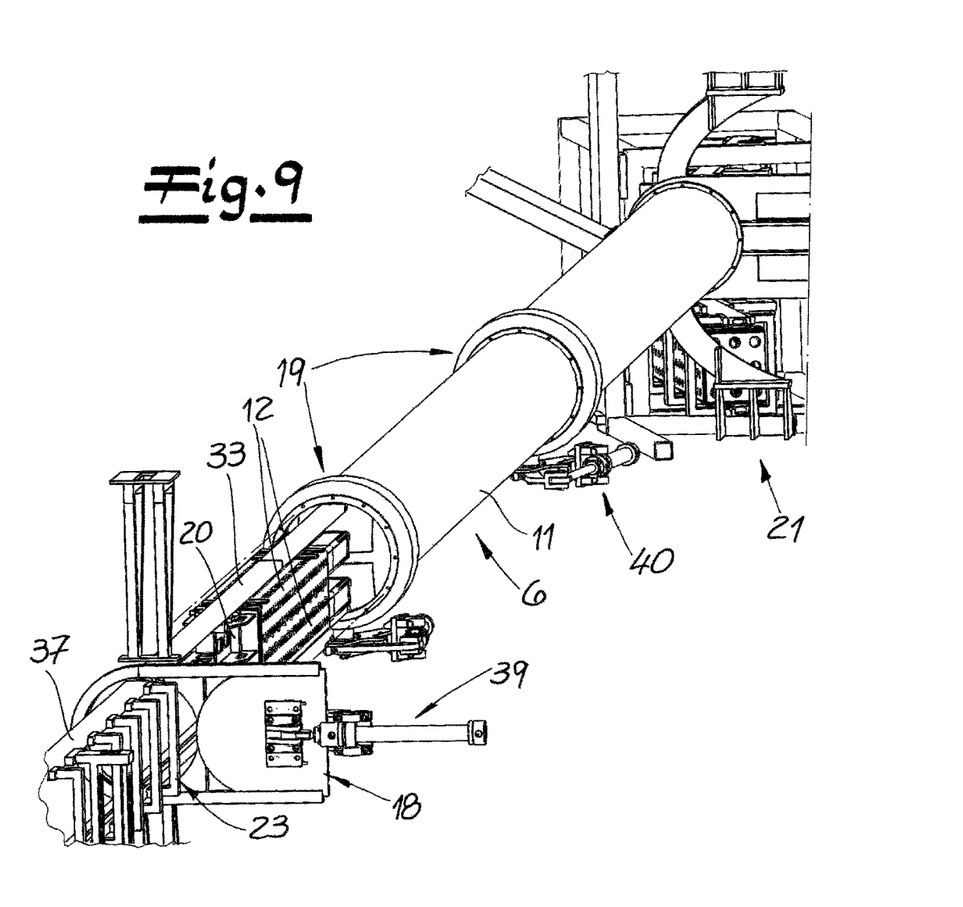
FIG. 9 is a different and partly cut-away view of the conveyor tube during transport.

Now the lift carriage 20, with the filled transport basket 12 set onto it, can be lowered using the cable hoist 13 (see FIGS. 7a and 7b). The lower blocking element 18 is closed, at first. The same holds true for the intermediate valves (ball valves 19) inside the conveyor tube 11. During lowering of the lift carriage 20 with the transport basket 12, the intermediate valves 19 are then individually opened step by step, in the manner of a lock system, and, after the lift carriage with transport basket 12 has moved through, are immediately closed again. This is possible because the intermediate valves 19 each have a cable passage 30 through which the traction cable 16 can pass in the closed position of this valve. In this manner, flow of liquid out of the upper pool 3 into the lower pool 4 during transport is prevented (see FIGS. 8a and 8b).

Before the transport basket 12 can exit the conveyor tube 11 at the lower end, the lower slide 18 is opened. In this regard, reference is made to FIG. 9 that shows the conveyor tube 11 in a view at an angle from below. It can be seen that the transport basket 12 is lowered below the lower intermediate valve 19, where this intermediate valve 19 is closed. The lower slide 18 is opened.

The lift carriage 20 with the transport basket 12 set onto it then exits from the conveyor tube 11 on the lower side, and consequently enters into the lower transfer device 22. In this regard, reference is made to FIGS. 10a and 10b.

Figure 10A:
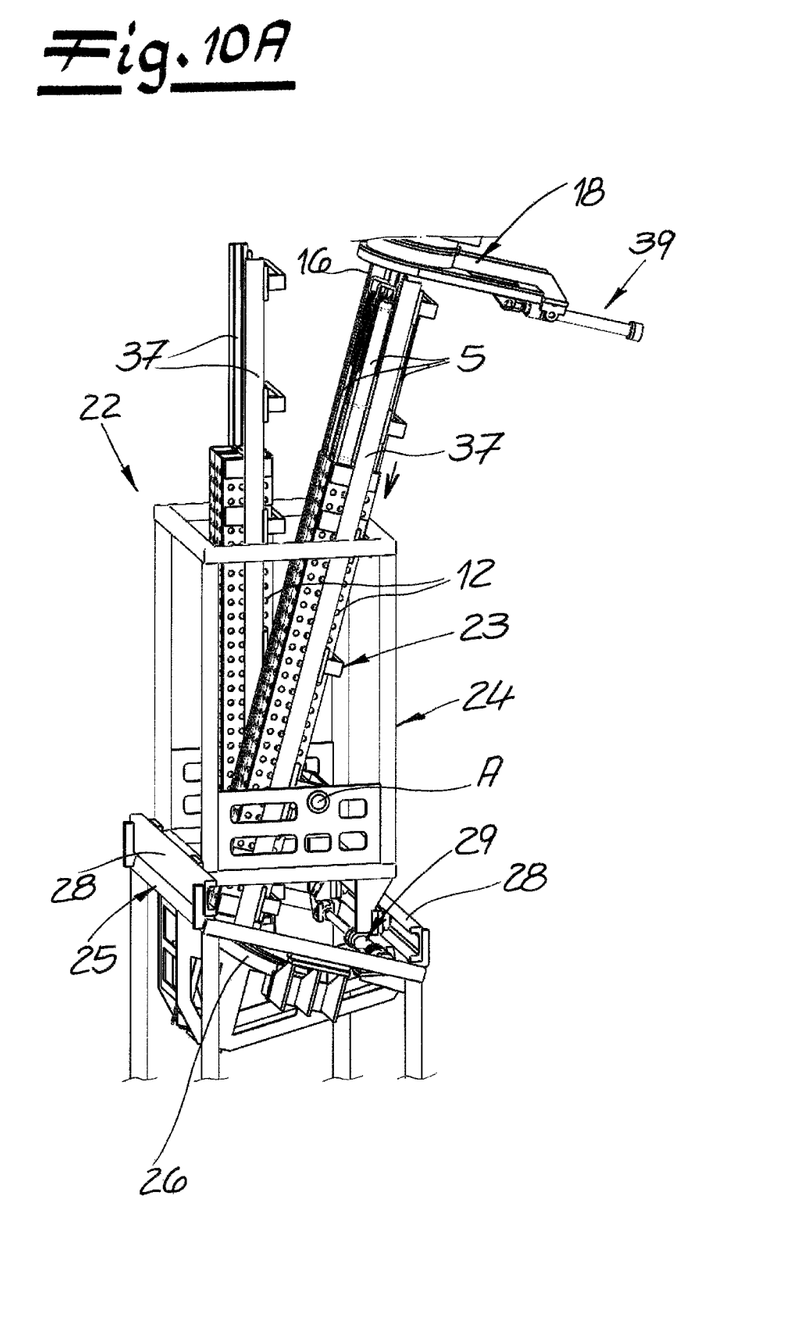
FIGS. 10a and 10b show the lower transfer device in different functional positions.
Figure 10B:
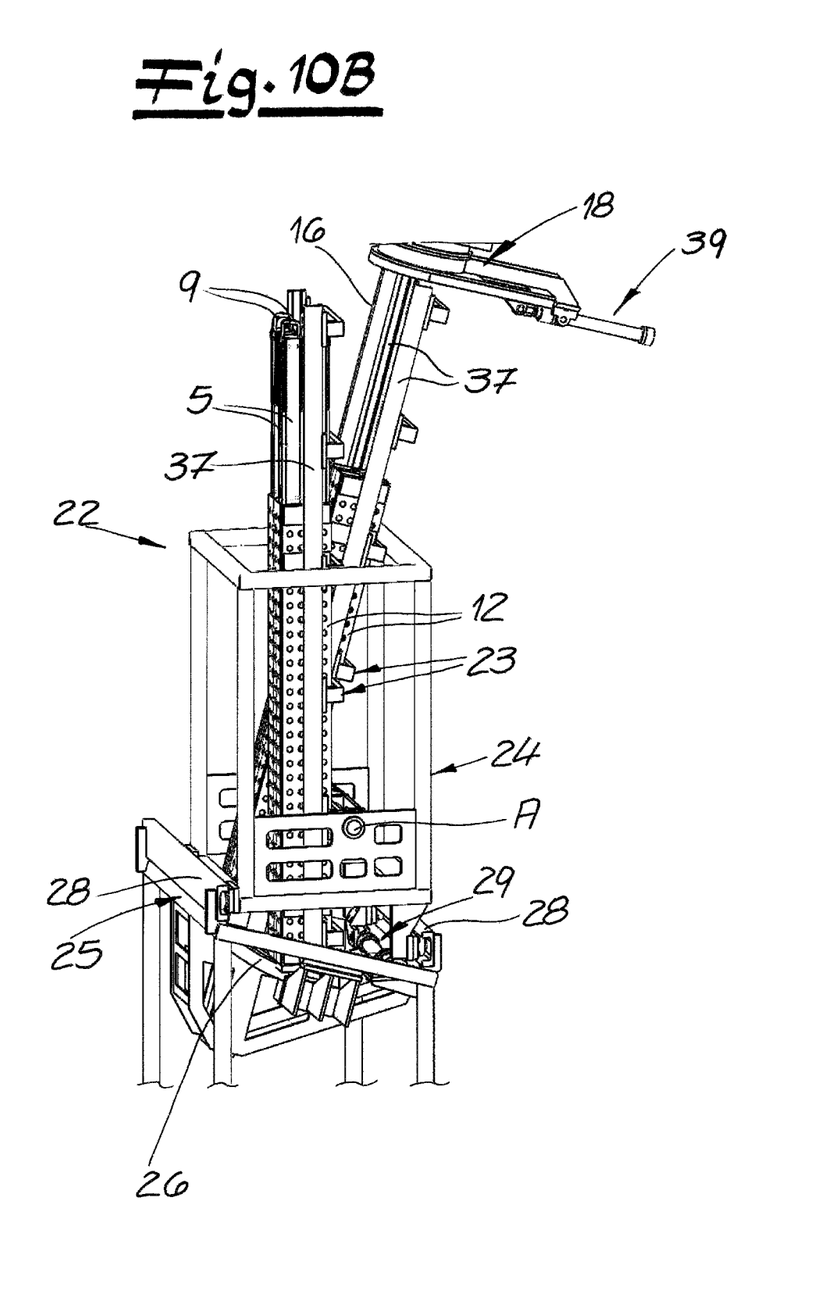

Consequently, the filled transport basket 12 is in the angled transport position in the lower transfer device 22, and furthermore, once again an empty transport basket 12 is provided in the vertical transfer position. The displacement frame 24 can be displaced again, so that the transport baskets are positioned and pivoted accordingly. The filled transport basket 12 consequently assumes the vertical transfer position, while the empty transport basket 12 assumes the angled transport position below the conveyor tube 11. Now the empty transport basket 12 can once again be transported upward with the lift carriage 20. During the same time, the filled transport basket 12 can be unloaded by the lower handler 10.

This makes it clear that the fuel elements can be transferred rapidly. In particular, loading can take place in the upper transfer device, and unloading can take place in the lower transfer device, at the same time. In particular, transport of a further transport basket 12 can be done by the transfer system during loading and unloading. Consequently, at least two transport baskets are preferably provided. In this embodiment, however, three transport baskets are provided, one transport basket always being in the upper transfer device and one transport basket in the lower transfer device, while a third transport basket can be transported between the upper transfer device and the lower transfer device.

FIG. 2, further shows that the traction cable 16 of the cable hoist 13 does not enter into the conveyor tube through the upper end of the conveyor tube 11, but rather that the conveyor tube 11 has below the upper slide 17 a lateral cable inlet port 31 through which the traction cable 16 passes out of the tube interior to the cable winch 14, specifically through a cable guide tube 32. This cable inlet port 31 is consequently provided below the slide 17 and, in particular, below the upper transfer device 21. Such a cable inlet port is particularly practical in connection with the lift carriage 20 that, as described, is underneath the transport baskets 12.

The figures furthermore show guide rails 33 inside the conveyor tube 11. The lift carriage 20 is equipped with guide elements, namely rollers 34 that are guided in these rails 33. The transport baskets are also equipped with guide elements 35 in the form of rollers also guided in the guide rails 33. Furthermore, guide rails 36 are also provided in the region of the upper transfer device 21, as are guide rails 37 in the region of the lower transfer device.

The upper transfer device 21 and the lower transfer device 22 are configured to be functionally equivalent in this embodiment. They differ, in terms of design, in specific details. This relates, for example, to the pivot frames 23. The pivot frames 23 of the upper transfer device are laterally closed on all sides, while the pivot frames 23 of the lower transfer device are open on one side. This is connected with the fact that the traction cable 16 in the lower transfer device 22 must be guided past the pivot frames 23, so pivoting of the pivot frames 23 must not be hindered by the traction cable.

Finally, the figures also show that the blocking elements 17, 18, and 19 are operated pneumatically. To this end, the upper slide 17 is provided with a pneumatic actuator 38. The lower slide 18 is also provided with a pneumatic actuator 39. The ball valves 19 are also provided with linearly acting pneumatic actuators 40 that engage the valve ball 42 of the valve 19 via a crank arm 41, this valve ball 42 having the cable passage 30 as described, configured as a hole of the valve ball 42.

In this embodiment, pneumatic actuators are indicated. Alternatively, however, electrical or hydraulic drives can also be is used.

We claim:

1. In combination with an upper pool and a lower pool of a nuclear plant, a system for transferring fuel elements between the pools, the system comprising:
a tube having an upper end at the upper pool and a lower end at the lower pool and extending at an acute angle to the vertical between the ends;
a plurality of baskets movable through the tube and into each of which at least one of the fuel elements can be placed for transport through the tube;
an upper device at the upper end in the upper pool for loading the fuel elements into or unloading them from the baskets; and
a lower device in the lower pool for loading fuel elements into or unloading them from the baskets, each of the devices having a respective frame adapted to hold two of the baskets, the frames holding the baskets being displaceable for positioning above or below the tube, the frames being pivotal between a vertical transfer position and an angled transport position.

2. The combination in claim 1, wherein the frames are mounted so as to pivot about a common axis.

3. The combination defined in claim 2, wherein the frames move pivotally both jointly during displacement.

4. The combination defined in claim 1, wherein the liquid level of the upper pool lies above the liquid level of the lower pool.

5. The combination defined in claim 1, further comprising:
a cable hoist having a traction cable guided through the tube for raising and lowering the baskets through the tube.

6. The combination defined in claim 5, further comprising:
a lift carriage guided through the tube, connected to the traction cable, and adapted to carry at least one of the basket for transport.

7. The combination defined in claim 5, further comprising:
a blocking element at the upper end of the tube, the tube being formed below the upper blocking element with a cable inlet port through which the traction cable is guided from the tube interior to a cable winch of the cable hoist.

8. The combination defined in claim 7, further comprising:
a partially closing blocking element in the tube below the upper end and provided with a cable passage through which the traction cable can pass in a closed position.

9. In combination with a nuclear plant having an upper and a lower pool, a system for transferring fuel elements between the upper pool and the lower pool, the system comprising:
a tube having an upper end at the upper pool and a lower end at the lower pool and extending at an acute angle to the vertical between the ends;
a plurality of baskets movable through the tube and into each of which at least one of the fuel elements can be placed for transport through the tube;
an upper device at the upper end in the upper pool for loading the fuel elements into or unloading them from the baskets; and
a lower device in the lower pool for loading fuel elements into or unloading them from the baskets, each of the devices having two frames each adapted to hold two of the baskets, the frames with the respective baskets being displaceable for positioning above or below the tube and being pivotal between a vertical transfer position and an angled transport position, the frames being mounted so as to pivot in a common displacement frame assembly and being displaceable therewith, the frames with the baskets set into them being positionable by displacement of the frame relative to the tube.

10. The combination defined in claim 9, wherein each device has a support frame in which the displacement frame assembly is displaceable and one or more control rails connected with the support frame.

11. In combination with an upper pool and a lower pool of a nuclear plant, a system for transferring fuel elements between the pools, the system comprising:
- a tube having an upper end at the upper pool and a lower end at the lower pool and extending at an acute angle to the vertical between the ends;
- a plurality of baskets movable through the tube and into each of which at least one of the fuel elements can be placed for transport through the tube;
- an upper device at the upper end in the upper pool for loading the fuel elements into or unloading them from the baskets;
- a lower device in the lower pool for loading fuel elements into or unloading them from the baskets, each of the devices having a respective frame adapted to hold two of the baskets, the frames holding the baskets being displaceable for positioning above or below the tube, the frames being pivotal about a common axis between a vertical transfer position and an angled transport position; and
- means for moving the frames pivotally and jointly.

12. The combination defined in claim 11, wherein the means includes:
- control rails in which the frames are guided during displacement in such a manner that the baskets pivot; and
- lower-side control pins on the frames guided in the control rails.

13. The combination defined in claim 12, wherein the control rails are curved.

14. In combination with a nuclear plant having an upper and a lower pool with a liquid level of the upper pool being above a liquid level of the lower pool, a system for transferring fuel elements between the upper pool and the lower pool, the system comprising:
- a tube having an upper end at the upper pool and a lower end at the lower pool and extending at an acute angle to the vertical between the ends;
- a plurality of baskets movable through the tube and into each of which at least one of the fuel elements can be placed for transport through the tube;
- an upper device at the upper end in the upper pool for loading the fuel elements into or unloading them from the baskets;
- a lower device in the lower pool for loading fuel elements into or unloading them from the baskets, each of the devices being adapted to hold two of the baskets, the baskets being displaceable for positioning above or below the tube and being movable between a vertical transfer position and an angled transport position;
- means for pivoting the frames jointly.

* * * * *